Figure 1:
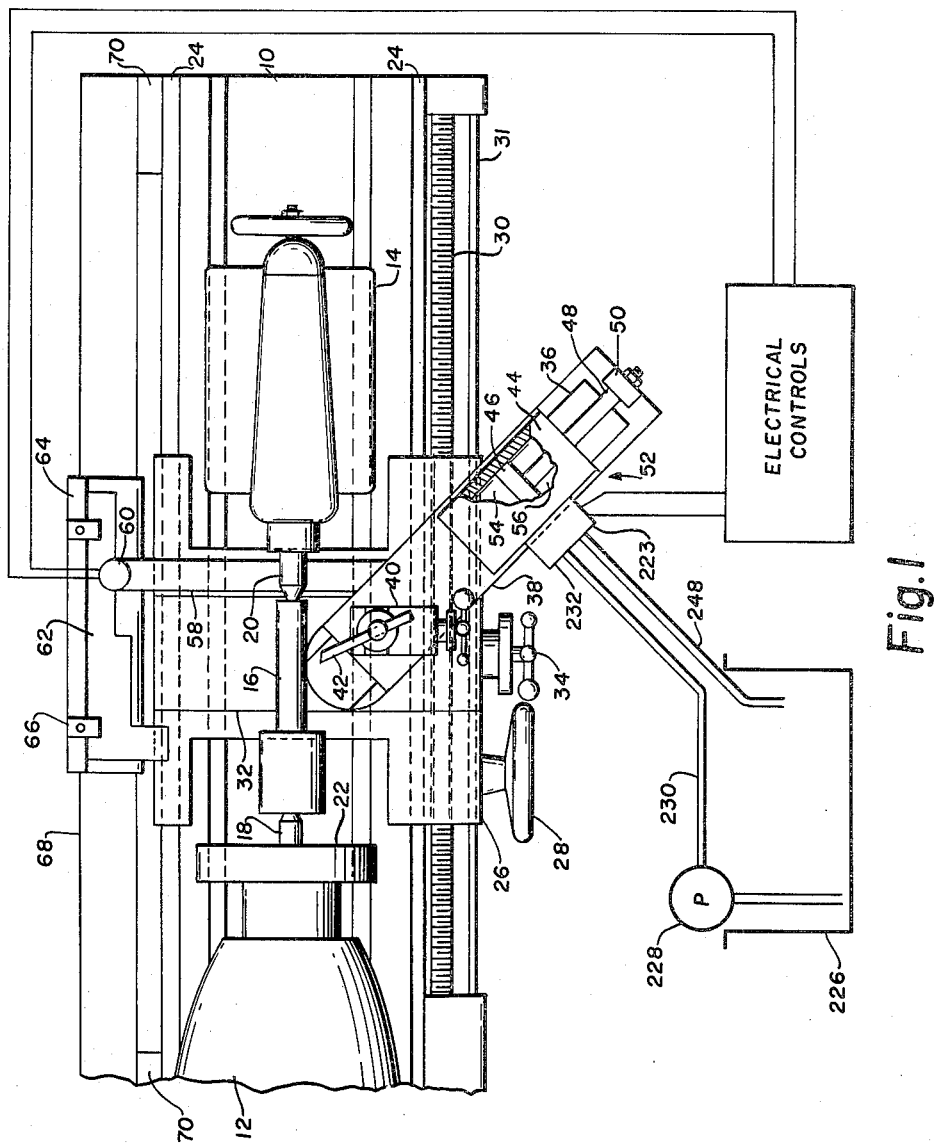

Jan. 23, 1962   W. H. ULMAN ETAL   3,017,863
ELECTRICAL CONTROL SYSTEM
Filed Feb. 15, 1957   2 Sheets-Sheet 1

INVENTORS,
WAYNE H. ULMAN
NAGLE V. GUSCHING
BY Woodling and Krost,
attys.

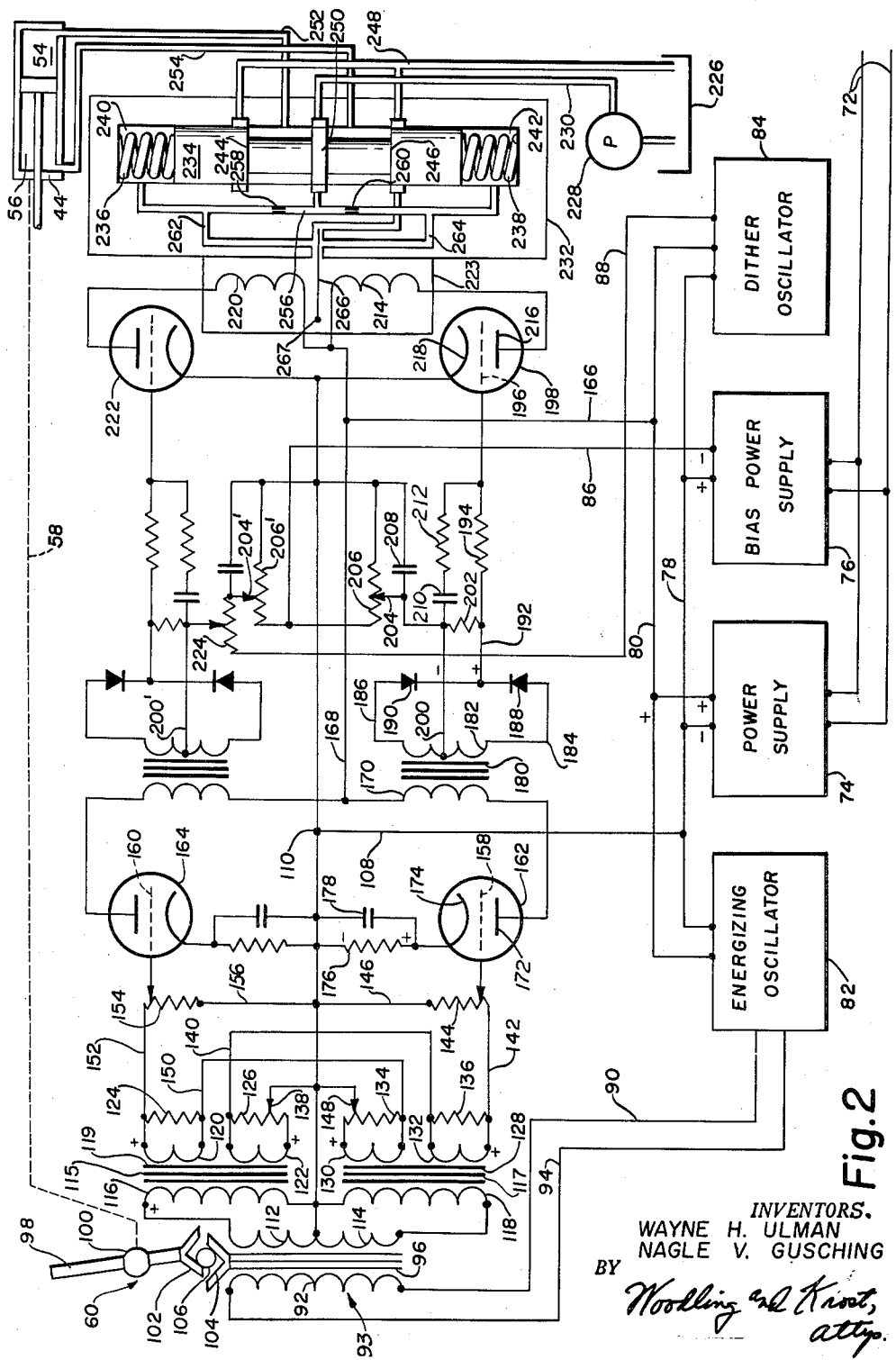

United States Patent Office 3,017,863
Patented Jan. 23, 1962

3,017,863
ELECTRICAL CONTROL SYSTEM
Wayne H. Ulman and Nagle V. Gusching, Sidney, Ohio, assignors to The Monarch Machine Tool Company, a corporation of Ohio
Filed Feb. 15, 1957, Ser. No. 640,422
7 Claims. (Cl. 121—41)

This invention relates to pattern controlled machine tools, and more particularly to electrically controlled, hydraulically operated angular tracer systems for lathes. In these devices, the tracer unit and the cutting tool are mounted on a tracer controlled slide that is mounted for motion at an acute angle with respect to the workpiece axis.

Known electrically controlled systems employ an electric tracer head which controls clutches driven by electric motive means to move the slide. In other systems, the tracer directly controls electric motive means, connected to move the slide. These systems are disadvantageous for the electric motor means and/or clutch elements have high inertia characteristics and thus respond to changes only slowly. Known hydraulically controlled systems employ hydraulic motors controlled by hydraulic tracer valves. These tracer valves are necessarily complex and expensive to manufacture. The requisite length of hydraulic tubing to connect the tracer and motor causes system delays.

Accordingly, it is an object of this invention to provide a simple angular tracer system which overcomes the above described objectionable features of the prior art.

It is another object of this invention to provide an electro hydraulic angular tracer system that has both rapid and accurate response to changes and pattern contour.

It is another object to provide a tracer system wherein position signals are electrical in nature and the position signals control the flow of hydraulic fluid which provides the slide positioning power.

Other objects and a fuller understanding of this invention may be had by referring to the following description and claims, taken in conjunction with the accompanying drawing, in which:

FIGURE 1 is a plan view of a portion of a lathe illustrating the manner in which the instant invention is associated therewith; and, FIGURE 2 is a schematic diagram of the electrical and hydraulic aspects of the tracer system embodying this invention.

Referring now to FIGURE 1, there is shown a conventional type of lathe having a bed 10 with a headstock 12 and a tailstock 14 mounted on the opposite ends thereof for supporting a workpiece 16 between their centers 18 and 20, respectively. The headstock 12 contains a motor (not shown) and appropriate speed-changing devices (not shown) for driving a face plate 22, which by a suitable lathe dog or the like (not shown) drives the workpiece 16. Mounted on ways 24 on the bed 10 for longitudinal movement therealong is a carriage 26, movable by a hand wheel 28, or by a lead screw 30 or a feed rod 31 which may be driven by a separate motor (not shown) or by driving connections from the headstock motor. A cross slide 32 is mounted on the carriage 26 for movement generally at right angles to the direction of carriage movement. Cross slide movement may be effected manually by a handle 34 on the carriage 26 or by appropriate driving connections from the lead screw 30 or feed rod 31.

Secured to the cross slide 32 for angular adjustment with respect thereto are ways 36 which slidably mount an angular slide 38 that carries a tool slide 40 at one end thereof for adjustably supporting a tool 42. Secured to the other end of the angular slide 38 is a power cylinder 44 having a piston 46 therein. A piston rod 48 sealingly extends through one end of the cylinder 44 and has its outer end secured to an upstanding lug 50 on the ways 36. The cylinder 44, piston 46, and piston rod 48 constitute a hydraulic motor 52, whereby admission of pressure fluid into one or the other of the motor chambers 54 and 56 will correspondingly move the angular slide 38 along its ways.

Attached to the angular slide 38 is a bracket 58 which supports a tracer unit 60 adjacent a template 62. The template 62 is supported on a template holder 64 by means of clamps 66, and the template holder 64 is supported on a template rail 68. Rail 68 is securely supported from the bed 10 by means of template rail support bracket 70. The tracer unit 60 has a movable tracer finger 98. This construction thus provides a closed loop servo control, since movement of the tracer finger 98 acuates the control system to cause movement of the angular slide 38, which moves the tracer unit 60 toward a rebalanced position, and hence bracket 58 provides this feedback.

Referring now to the tracer system schematic circuit of FIGURE 2, electric power, preferably in alternating current form, is supplied to the electrical system through incoming power lines 72 which are connected to the main power supply 74 and to the bias power supply 76. The output of the main power supply is connected to a ground line 78 and a power line 80 which in turn are connected to supply power to an energizing oscillator 82 and a dither oscillator 84. The positive side of the bias power supply 76 is connected to the ground line 78 along with one output lead of the oscillator 84. The output of power supply 76 is also connected to an output line 86 and the output line of oscillator 84 is identified by the number 88.

The output of oscillator 82 is connected through line 90, the primary 92 of a transformer 93, and back to the oscillator through line 94. The primary 92 is part of and energizes an adjustable linear differential transformer having a core 96 movable by the tracer finger 98 which comprises the tracer unit 60 and provides a variable reactance. The tracer finger is suitably journalled for motion by means of a ball and socket joint 100. The end of the tracer finger away from the template is provided with a conical concavity 102 which faces a similar concavity 104 in a member mounted on the movable core 96 of the differential transformer. The core is restrained for longitudinal motion, up and down as shown in FIGURE 2, and is urged upwardly by a spring (not shown) which urges the tracer finger 98 toward an undeflected position. A ball 106 is engaged between the cavities 102 and 104 so that rocking motion of the tracer finger 98 causes vertical axial motion of the movable core 96.

Line 78 is connected through line 108 to a main ground line 110. A pair of transformer secondaries 112 and 114 are connected to the ground line 110 and respectively in series with the primaries 116 and 118 of a pair of matched transformers 115 and 117. When the tracer finger 98 is in an undeflected position, the core 96 is moved upward to cause a higher amplitude signal circulating through secondary 112 and primary 116 than circulating through secondary 114 and primary 118. When the core 96 is in its central position (as shown) and the tracer finger 98 is in its neutral or balance position (as shown), current of equal amplitude flows through the secondaries 112 and 114 thereby causing equal signals at primaries 116 and 118. When the tracer finger is deflected farther than the balance position shown to an over-deflected position, the secondary 114 is energized to a greater extent than secondary 112 and thereby causes a larger signal in primary 118 than in primary 116.

The transformer 115 is provided with a core 119 and a pair of secondaries 120 and 122. A loading resistor 124 and a potentiometer 126 are respectively connected across the outputs of secondaries 120 and 122 to help prevent phase shift with changes in load.

Similarly, transformer 117 is provided with a core 128 and a pair of secondaries 130 and 132. Respectively connected across these secondaries are a potentiometer 134 and a loading resistor 136. It has been previously noted that an increase in the energization of primary 113 is accompanied by a decrease in energization in primary 116. Accordingly, secondary 132 is serially connected through line 140 to potentiometer 126, which shunts secondary 122, by means of movable tap 138, line 110, line 146, potentiometer 144 and line 142. The values of the secondaries 122 and 132 are chosen, and the secondaries are connected in voltage opposition, so that when the tracer finger is undeflected, the voltage from potentiometer 126 completely bucks out all of the signals induced in secondary 132 so that no current is flowing through potentiometer 144. The polarities of the windings are as shown on FIGURE 2 at a given time in the alternating current cycle. With increasing deflection of the tracer finger 98, the secondary 132 receives more energization and the secondary 122 receives less energization so that the signal, which is the algebraic addition of the signals from potentiometer 126 and primary 132, increases from substantially zero at no deflection to a maximum at full deflection of the tracer finger 98. It should be noted that the phases of secondaries 122 and 132 are one hundred eighty electrical degrees apart so that cancellation of the signal of one transformer secondary by another is made with relative ease.

The voltage at the tap 138 of potentiometer 126, in the tracer neutral position shown, is only a few percent less than the voltage across secondary 132, so that only one or two thousandths of an inch movement of the finger 98 toward the undeflected position is required to move core 96 upwardly to raise the voltage at potentiometer 126 and lower the voltage at secondary 132, to obtain substantially complete cancellation of these two voltages which are connected in series opposition.

Similarly, secondary 120 is serially connected through line 150 with potentiometer 134 by means of movable tap 148, line 110, line 156, potentiometer 154 and line 152. In this side of the circuit, the signal is at a maximum when the tracer finger 98 has no deflection and is zero when the tracer finger is deflected to its farthest position.

The transformers 93, 115, and 117 thus comprise magnetic means or variable reactance means which has a signal output variable from substantially zero to a given maximum value, and which also has a second signal output variable from a given maximum to substantially zero.

The potentiometers 144 and 154 have their taps connected to the grids 158 and 160 of tubes 162 and 164 respectively. Inasmuch as this part of the tracer device is substantially symmetrical around the ground line 110, only the lower portion will be described, it being understood that the upper portion operates in the same way.

The power supply line 80 is connected through line 166 to line 168 and thence through transformer primary 170 to the plate 172 of tube 162. The cathode 174 of this tube is connected through a cathode bias resistor 176 to the line 110 which is the ground line of the power supply. Thus, a voltage is connected across this tube, and the cathode bias resistor 176 connected through line 110 and line 146 to potentiometer 144 tends to maintain the cathode positive with respect to the grid in the continuous conduction region for continuous conduction of the tube as in class A amplifier practice. A condenser 178 paralleled with the resistor 176 stabilizes the grid to cathode voltage by supplying a substantially short circuit for the frequency of the energizing oscillator 82, which may be in the order of 2000 cycles per second. The grid 158 is connected to the tap of potentiometer 144 so that changes in current flow through potentiometer 144 changes the grid to cathode voltage for control of the tube. It is thus seen that tube 162 is a constant current tube and that the tracer signal wave impressed by potentiometer 144 upon the grid 158 modulates the output of tube 162 and thus the input to primary 170. With no deflection of the tracer finger there is no tracer signal voltage on potentiometer 144, and the output of the tube 162 is purely direct current. With increasing deflection of the tracer finger 98 an increasing amplitude of the energizing wave form appears in the tube output so at maximum deflection of the tracer finger, the tube output includes an alternating current signal of substantial amplitude. This signal energizes the primary 170 of a transformer having a core 180 and a center tapped secondary 182. The transformer, of course, does not permit the direct current voltage level in the primary 170 to appear in the secondary 182, but only the tracer signal frequency along with its amplitude in proportion to tracer finger deflection. The secondary 182 is connected by lines 184 and 186 to diodes 188 and 190 respectively. These diodes are connected together to line 192 and through a resistance 194 to the grid 196 of a tube 198. The center tap of the transformer secondary 182 is connected by means of a line 200 to a resistor 202 which in turn is connected to the line 192, and is also connected to the tap 204 of a bias potentiometer 206 which has one end connected to the line 86 to supply grid bias to the tube 198. The other end of potentiometer 206 is connected to ground line 110, and a condenser 208 is parallel across the tap 204 to the ground line 110, to provide a smoothing action to filter out any unevenness of the grid bias supply. Additionally, a series combination of condenser 210 and resistor 212 is connected between line 200 and the grid 196. The resistor 202 is thus connected across the diodes 188 and 190 for the loading thereof, and it also acts as a direct current path from grid to cathode of tube 198. The resistors 194 and 212 and the condenser 210 form a phase shift network to establish system stability. It is well known that a servomotor system has a certain amount of time lag between the initiation of an input signal and the response of an output member. If the output member is also connected to the input signal as in the instant closed loop servo, it can be seen that a critical amount of delay would cause continuous oscillation. Thus, the network comprising resistors 194 and 212 and condenser 210 insert sufficient phase shift to prevent the time delay of the instant circuit from being critical. It should be here noted that in some systems where the mechanical elements are of the correct weight and the hydraulic system pressures and responses are correct, such a network might not be necessary. The values of the circuit components of the network are completely dependent upon characteristics of the system as a whole.

With an increasing amplitude of signal in the secondary 182, the diodes 188 and 190 cause an increase in voltage in line 192 and thus make more positive the grid to cathode voltage of amplifier 198. The power supply line 168 is connected through an output coil 214 and to a plate 216 of tube 198. The cathode 218 is connected to the ground line 110. When the grid 196 becomes more positive with respect to cathode 218, conduction increases in the tube 198 and through the serially connected coil 214. A similar coil 220 is connected to be energized by a tube 222 which is controlled by a similar circuit to the one just described. The coils 214 and 220 operate a hydraulic valve 223 in the here-in-after described manner, and to prevent the hydraulic valve from becoming sticky, it is also energized from the dither oscillator 84 which keeps the valve in constant motion. The oscillator 84 may operate at a lower frequency than that of energizing oscillator 82, for example, it may have a frequency in the order of 800 cycles per second. The alternating current output of oscillator 84 is impressed on the coil 220 and does not influence the tracer signal coming through the system. The oscillator 84 has one output line grounded to line 110 and has its other output line 88 connected to a potentiometer 224. The tap of this potentiometer is connected to the center tap line 200' which corresponds to the center tap line 200 of secondary 182. The potentiometer 224 is also connected to the tap 204' of the grid bias control potentiometer 206' which is energized from line 86 and thus, the output of oscillator 84 is connected to the grid of tube 222 to keep the valve in constant motion.

A sump 226 serves as a receptacle for hydraulic fluid and a pump 228, suitably driven by a motor and protected by a relief valve, withdraws hydraulic fluid from the sump and discharges it into line 230. The flow of hydraulic oil from line 230 is controlled by valve 223 having a body 232 and a stem 234. The stem 234 lies in an axial bore in the body 232 and is centered therein by springs 236 and 238 which lie respectively in cavities 240 and 242 in the bore at the ends of the spool. The spool is provided with lands 244 and 246 which control the flow of fluid to ports which connect to drain line 248 which returns the hydraulic fluid to the sump 226. A land 250 controls the discharge from line 230 to lines 252 and 254 which are respectively connected to the spaces 54 and 56 in the cylinder 44. Motion of the spool 234 is controlled by a hydraulic pilot system which is electrically actuated by the coils 214 and 220. Fluid under pressure passes from line 230 to line 256 and thence to orifices 258 and 260 which are respectively connected to the spaces 240 and 242 and by means of lines 262 and 264 to orifices controlled by a vane 266. This vane is pivoted at 267 at its left end as seen in the drawing or it may be mounted in cantilever fashion from that end. In neutral position of the tracer finger 98 as has been previously described, the coils 220 and 214 are equally energized so that the vane 266 remains in its central position. With increasing deflection of the tracer finger 98, energization of coil 214 increases and energization of coil 220 decreases thus moving vane 226 downward to relatively close line 264 and relatively open line 262. Fluid flowing from line 230 passes through orifice 260 and the pressure in space 242 increases with respect to the pressure in space 240. Thus, the valve stem 234 moves upwardly until the spring forces total with the hydraulic forces in the spaces to produce a new force balance. Now the line 230 is relatively open with respect to line 254 and line 252 is relatively open to drain line 248 and increased pressure in space 56 causes retraction of the slide 38 and the oil in space 54 is pased through lines 252 and 248 to the sump 226.

Similarly, deflection of the tracer to an extent less than balance will cause increased energization of the coil 220 and decreased energization of coil 214 with the resultant downward motion of spool 234 and pressurization of space 54 to cause inward motion of the slide 38.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. An electrical control system, comprising, a variable transformer actuatable in a first direction from a neutral and having first and second outputs, said first output being arranged so that a signal emitted therefrom decreases with increasing actuation in said first direction, said second output being arranged so that the signal emitted therefrom increases with increasing actuation in said first direction, said first and second outputs being respectively serially connected to the primaries of second and third transformers, said second and third transformers each having two secondaries with one of the secondaries of said second transformer being serially connected to one of the secondaries of the third transformer and the other secondary of said third transformer being serially connected to the other secondary of said second transformer, said first and second outputs of said variable transformer being substantially one hundred eighty electrical degrees apart so that the voltages of the serially connected secondaries of said second and third transformers electrically subtract from each other and the voltage values of said secondaries are arranged so that when the variable transformer is in said neutral position, the output of one of the secondary series combinations is at a maximum and the output of the other secondary series combination is substantially zero and when the variable transformer is actuated to a maximum in said first direction, the output of the said one of the secondary series combination is substantially zero and the output of the said other secondary series combination is substantially maximum to provide two inversely varying signals, and means connecting said inversely varying signals to actuate said variable transformer.

2. A control system comprising, adjustable linear differential transformer means having magnetic core means actuable in a first direction from neutral, first, second, third and fourth windings connected to receive energization from said transformer means, said first and second windings being arranged so that signals emitted therefrom decrease with increasing actuation of said core means in said first direction, said third and fourth windings being arranged so that signals emitted therefrom increase with increasing actuation of said core means in said first direction, means connecting said first and third windings in voltage opposition, means connecting said second and fourth windings in voltage opposition, the voltage values of said windings being arranged so that when said transformer core means is in said neutral position the output of said first and third windings is substantially maximum and the output of said second and fourth windings is substantially zero, and when said core means is actuated to a maximum in said first direction the output of said first and third windings is substantially zero and the output of said second and fourth windings is substantially maximum to provide first and second inversely varying signals.

3. A control system comprising adjustable linear differential transformer means having magnetic core means movable in a first direction from neutral, first, second, third and fourth windings connected to receive energization from said transformer means, said first and second windings being arranged so that signals emitted therefrom decrease with increasing actuation of said core means in said first direction, said third and fourth windings being arranged so that signals emitted therefrom increase with increasing actuation of said core means in said first direction, means connecting in series said first and third windings in voltage opposition, means connecting in series said second and fourth windings in voltage opposition, the voltage values of said windings being arranged so that when said transformer core means is in said neutral position the output of said first and third windings is substantially maximum and the output of said second and fourth windings is substantially zero, and when said core means is actuated to a maximum in said first direction the output of said first and third windings is substantially zero and the output of said second and fourth windings is substantially maximum to provide first and second inversely varying signals, and means connected to said first and second inversely varying signals to control actuation of said magnetic core means.

4. A control system comprising an adjustable linear differential transformer having a magnetic core movable in a first direction from neutral, an energizing oscillator operated at a given frequency connected to said transformer, first, second, third and fourth windings connected to receive energization from said transformer, said first and second windings being arranged so that signals emitted therefrom decrease with increasing actuation of said core in said first direction, said third and fourth windings being arranged so that signals emitted therefrom increase with increasing actuation of said core in said first direction, means connecting in series said first and third windings in voltage opposition, means connecting in series said second and fourth windings in voltage opposition, the voltage values of said windings being arranged so that when said transformer core is in said neutral position the output of said first and third windings is substantially maximum and the output of said second and fourth windings is substantially zero, and when said core is actuated to a maximum in said first direction the output of said first and third windings is substantially zero and the output of said second and fourth windings is substantially maximum to provide first and second inversely varying signals, a first amplifier system connected to receive said first varying signal, a second amplifier system connected to receive said second varying signal, electromagnetic outputs from said first and second amplifier systems, and means connected to said first and second amplifier systems to control actuation of said magnetic core.

5. An electrical control system comprising a variable inductance actuatable in a first direction from a neutral and having first and second outputs, said first output being arranged so that a signal emitted therefrom decreases with increasing actuation in said first direction, said second output being arranged so that the signal emitted therefrom increases with increasing actuation in said first direction, said first and second outputs being respectively serially connected to the primaries of first and second transformers, said first and second transformers each having two secondaries with one of the secondaries of said first transformer being connected to one of the secondaries of the second transformer and the other secondary of said transformer being connected to the other secondary of said first transformer, said first and second outputs of said variable inductance being phase related so that the voltages of the connected secondaries of said first and second transformers electrically subtract from each other and when the variable inductance is in said neutral position, the output of one of the secondary combinations is at a maximum and the output of the other secondary combination is substantially zero and when the variable inductance is actuated to a maximum in said first direction, the output of the said one of the second combinations is substantially zero and the output of the said other secondary combination is substantially maximum.

6. An electrical control system comprising a variable transformer actuatable in a first direction from a neutral and having first and second outputs, said first output being arranged so that a signal emitted therefrom decreases with increasing actuation in said first direction, said second output being arranged so that the signal emitted therefrom increases with increasing actuation in said first direction, said first and second outputs being respectively serially connected to the primaries of second and third transformers, said second and third transformers each having two secondaries with one of the secondaries of said second transformer being serially connected to one of the secondaries of the third transformer and the other secondary of said third transformer being serially connected to the other secondary of said second transformer, the serially connected secondaries of said second and third transformers being connected to electrically subtract from each other and the voltage values of said secondaries are arranged so that when the variable transformer is in said neutral position, the output of one of the secondary series combinations is at a maximum and the output of the other secondary series combination is substantially zero and when the variable transformer is actuated to a maximum in said first direction, the output of the said one of the secondary series combinations is substantially zero and the output of the said other secondary series combination is substantially maximum to provide two inversely varying signals.

7. An electrical control system comprising a variable transformer actuatable in a first direction from a neutral and having first and second outputs, said first output being arranged so that a signal emitted therefrom decreases with increasing actuation in said first direction, said second output being arranged so that the signal emitted therefrom increases with increasing actuation in said first direction, said first and second outputs being respectively serially connected to the primaries of second and third transformers, said second and third transformers each having two secondaries with one of the secondaries of said second transformer being serially connected to one of the secondaries of the third transformer and the other secondary of said third transformer being serially connected to the other secondary of said second transformer, said first and second outputs of said variable transformer being substantially one hundred eighty electrical degrees apart so that the voltages of the serially connected secondaries of said second and third transformers electrically subtract from each other and the voltage values of said secondaries are arranged so that when the variable transformer is in said neutral position, the output of one of the secondary series combinations is at a maximum and the output of the other secondary series combinations is substantially zero and when the variable transformer is actuated to a maximum in said first direction, the output of the said one of the secondary series combinations is substantially zero and the output of the said other secondary series combination is substantially maximum to provide two inversely varying signals.

References Cited in the file of this patent

UNITED STATES PATENTS

| | | |
|---|---|---|
| 1,943,463 | Ohlsen et al. | Jan. 16, 1934 |
| 2,293,502 | Hermann | Aug. 18, 1942 |
| 2,437,603 | Hornfeck | Mar. 9, 1948 |
| 2,557,224 | Hornfeck | June 19, 1951 |
| 2,557,824 | Hornfeck | June 19, 1951 |
| 2,674,099 | Mason | Apr. 6, 1954 |
| 2,674,232 | Mason | Apr. 6, 1954 |
| 2,691,962 | Johnson | Oct. 19, 1954 |
| 2,716,395 | Pettigrew et al. | Aug. 30, 1955 |
| 2,850,686 | MacGeorge | Sept. 2, 1958 |